US010311470B2

(12) United States Patent
Zeigler et al.

(10) Patent No.: US 10,311,470 B2
(45) Date of Patent: Jun. 4, 2019

(54) SYSTEMS AND METHODS FOR PROVIDING CALLBACK ADDRESSES AND VIEWERSHIP METRICS

(71) Applicant: COX COMMUNICATIONS, INC., Atlanta, GA (US)

(72) Inventors: Mike Zeigler, Atlanta, GA (US); Dan Garvel, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 75 days.

(21) Appl. No.: 14/195,270

(22) Filed: Mar. 3, 2014

(65) Prior Publication Data

US 2015/0248695 A1 Sep. 3, 2015

(51) Int. Cl.
  *G06F 15/16* (2006.01)
  *G06Q 30/02* (2012.01)
  *H04N 21/234* (2011.01)
  *H04N 21/237* (2011.01)
  *H04N 21/2387* (2011.01)

(52) U.S. Cl.
  CPC ..... *G06Q 30/0246* (2013.01); *H04N 21/2387* (2013.01); *G06F 15/16* (2013.01); *H04N 21/234* (2013.01); *H04N 21/237* (2013.01)

(58) Field of Classification Search
  USPC ...................................................... 705/14.45
  See application file for complete search history.

(56) References Cited

U.S. PATENT DOCUMENTS

| 2008/0301189 A1* | 12/2008 | Petit et al. ................. 707/104.1 |
| 2013/0159455 A1* | 6/2013 | Braskich ............... H04L 67/303 709/217 |
| 2016/0134905 A1* | 5/2016 | Robert ........... H04N 21/234309 725/88 |

OTHER PUBLICATIONS

Nunzio Fartalone, Using Iframes for Embedded Video, Jan. 1, 2014, printed through www.archive.org Date is in URL in YYYYMMDD format.*
Video Compression Video Types, Feb. 16, 2014, printed from www.archive.org Date is in URL in YYYYMMDD format.*
MPEG Video Compression Technique, Jan. 15, 2014, Chemnitz University of Technology, printed through www.archive.org, date is in the URL in YYYYMMDD format.*

* cited by examiner

*Primary Examiner* — Scott D Gartland
*Assistant Examiner* — Christopher B Tokarczyk
(74) *Attorney, Agent, or Firm* — Eversheds Sutherland (US) LLP

(57) ABSTRACT

Embodiments disclosed herein relate to systems and methods for validating adcopy instructions. A method may include generating, by a computer including one or more processors, media content. The method may also include identifying, by the computer, a destination server to receive playback statistics associated with playback of the media content. Furthermore, the method may include determining, by the computer, a callback address identifier associated with the destination server. Additionally, the method may include encoding, by the computer, the callback address identifier within the media content and transmitting, by the computer, the media content to a user device for playback.

14 Claims, 3 Drawing Sheets

SYSTEMS AND METHODS FOR PROVIDING CALLBACK ADDRESSES AND VIEWERSHIP METRICS

TECHNICAL FIELD

Embodiments of this disclosure relate generally to systems and methods for generating and/or providing callback addresses in media content.

BACKGROUND

Currently, measuring and reporting the consumption and/or playback of media content by users may involve multiple intermediaries between a content provider and a user. Such an environment may also present certain difficulties with respect to obtaining playback statistics across video platforms and content providers.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
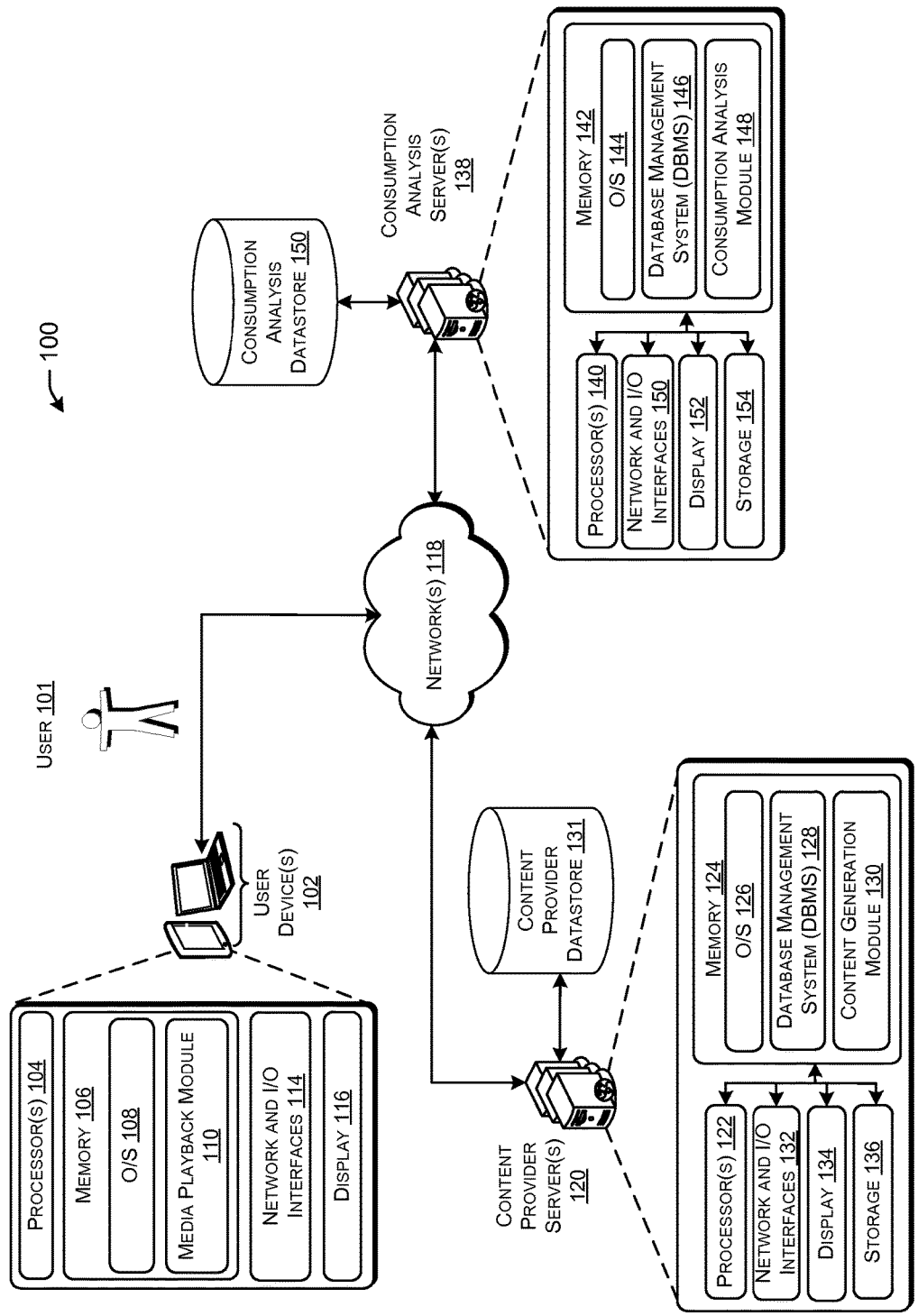
FIG. 1 illustrates a block diagram of an example system for providing callback addresses, in accordance with one or more embodiments of the disclosure.

Embodiments of the disclosure now will be described more fully hereinafter with reference to the accompanying drawings, in which embodiments of the disclosure are shown. This disclosure may, however, be embodied in many different forms and should not be construed as limited to the embodiments set forth herein; rather these embodiments are provided so that this disclosure will be thorough and complete, and will fully convey the scope of the disclosure to those skilled in the art. Like numbers refer to like elements throughout.

Certain embodiments herein may be directed to providing systems and methods providing callback addresses. Thus, according to one or more embodiments of the disclosure, a method is provided. The method may include generating, by a computer including one or more processors, media content. The method may also include identifying, by the computer, a destination server to receive playback statistics associated with playback of the media content. Furthermore, the method may include determining, by the computer, a callback address identifier associated with the destination server. Additionally, the method may include encoding, by the computer, the callback address identifier within the media content and transmitting, by the computer, the media content to a user device for playback.

According to one or more other embodiments of the disclosure, a system is provided for providing callback addresses. The system may include at least one memory for storing data and computer-executable instructions. The system may also include at least one processor to access the at least one memory and to execute the computer-executable instructions. The at least one processor may be configured to execute the instructions to generate media content. The at least one processor may also be configured to execute the instructions to identify a destination server to receive playback statistics associated with playback of the media content. The at least one processor may further be configured to execute the instructions to determine a callback address identifier associated with the destination server. Additionally, the at least one processor may further be configured to execute the instructions to encode the callback address identifier within the media content and transmit the media content to a user device for playback.

According to one or more other embodiments of the disclosure, another method is provided for providing callback addresses. The method may include receiving, by a user device including one or more processors, from a content provider server, media content. The method may also include performing, by the user device, playback of the media content and extracting, by the user device from the media content, a callback address identifier. Furthermore, the method may include determining, by the user device based at least in part on playback of the of media content, playback statistics associated with the playback. Additionally, the method may include transmitting, by the user device, the playback statistics to a destination server associated with the extracted callback address identifier.

FIG. 1 illustrates an example system 100 for providing callback addresses, in accordance with one or more embodiments of the disclosure. The system 100 of FIG. 1 includes one or more users 101, one or more content provider server(s) 120, and one or more consumption analysis server(s) 138. The user device(s) 102, the content provider server(s) 120, and the consumption analysis server(s) 138 may all be in communication with each other via one or more network(s) 118, which may include one or more independent and/or shared private and/or public networks including the Internet or a publicly switched telephone network. In other example embodiments, one or more components of the system 100 may communicate via direct connections and/or communication links.

Generally, network devices and systems, including the user device(s) 102, the content provider server(s) 120, and the consumption analysis server(s) 138, may include or otherwise be associated with suitable hardware and/or software for transmitting and receiving data and/or computer-executable instructions over one or more communication links or networks. These network devices and systems may also include any number of processors for processing data and executing computer-executable instructions, as well as other internal and peripheral components currently known in the art or which may be developed in the future. Further, these network devices and systems may include or be in communication with any number of suitable memory devices operable to store data and/or computer-executable instructions. By executing computer-executable instructions, each of the network devices may form a special-purpose computer or particular machine. As used herein, the term "computer-readable medium" describes any medium for storing computer-executable instructions.

Each of these components—the user device(s) 102, the content provider server(s) 120, and the consumption analysis server(s) 138—will now be discussed in further detail. Although the components are generally discussed as singular components, as may be implemented in various example embodiments, in alternative exemplary embodiments each component may include any number of suitable computers and/or other components.

With continued reference to FIG. 1, the user device 102 may refer to any type of electronic device, and, more particularly, may refer to one or more of the following: a wireless communication device, a portable electronic device, a telephone (e.g., cellular phone, smart phone), a computer (e.g., laptop computer, tablet computer), a wearable computer device, a portable media player, a personal digital assistant (PDA), a cable set-top box, a satellite set-top box, or any other electronic device having a networked capability. The user device(s) 102 may include one or more computer processors 104, and a memory 106 storing an operating system (O/S) 108 and a loyalty account application 110. In addition, the user device(s) 102 may include one or more network and I/O interfaces 112, and a display 114. In certain embodiments, the user device(s) 102 may include one or more sensors capable of gathering information associated with a present environment of the user device(s) 102, or similar hardware devices, such as a camera, microphone, antenna, a gesture capture or detection device, or Global Positioning Satellite (GPS) device.

The computer processors 104 may comprise one or more cores and may be configured to access and execute (at least in part) computer-readable instructions stored in the memory 106. The one or more computer processors 104 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 102 may also include a chipset (not shown) for controlling communications between the one or more processors 104 and one or more of the other components of the user device 102. In certain embodiments, the user device 102 may be based on an Intel® architecture or an ARM® architecture, and the processor(s) and chipset may be from a family of Intel® processors and chipsets. The one or more processors 104 may also include one or more application-specific integrated circuits (ASICs) or application-specific standard products (ASSPs) for handling specific data processing functions or tasks.

The memory 106 may include one or more computer-readable storage media (CRSM). In some embodiments, the memory 106 may include non-transitory media such as random access memory (RAM), flash RAM, magnetic media, optical media, solid state media, and so forth. The memory 106 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 106 may store an operating system 108 that includes a plurality of computer-executable instructions that may be implemented by the computer processor to perform a variety of tasks to operate the interface(s) and any other hardware installed on the user device 102. The memory 106 may also store content that may be displayed by the user device 102 or transferred to other devices (e.g., headphones) to be displayed or played by the other devices. The memory 106 may also store content received from the other devices.

The content from the other devices may be displayed, played, or used by the user device 102 to perform any necessary tasks or operations that may be implemented by the computer processor or other components in the user device 102.

The memory 106 may also include an operating system (O/S) 108, which may provide an interface between other application software executing on the user device 102 and hardware resources of the user device 102. More specifically, the operating system 108 may include a set of computer-executable instructions for managing hardware resources of the user device 102 and for providing common services to other application programs (e.g., managing memory allocation among various application programs). The operating system 108 may include any operating system now known or which may be developed in the future including, but not limited to, any consumer operating system, any server operating system, any mainframe operating system, or any other proprietary or freely available operating system.

The memory 106 may also include a media playback module 110, which may be configured to perform playback of one or more types of media content. For example, media content may include video content, audio content, textual content, and/or the like. To this end, the media content may include movies, television shows, music, advertisement, and/or the like. In certain instances, the media playback module 110 may be referred to as a media player. It will be understood that the media playback module 110 may be implemented in various ways, all of which are contemplated in the present disclosure.

Furthermore, in some embodiments, the memory 106 may also include a playback statistics module 112, which may be configured to determine one or more playback statistics associated with playback of the media content. For example, playback statistics may include, but are not limited to, data associated with a media player type, a media player version, a playback duration, a playback start time, a playback end time, and/or the like. To this end, the playback statistics module 112 may be configured to analyze such playback statistics during and/or after playback of the media content by the media playback module 110.

The one or more network and I/O interfaces 114 may include one or more communication interfaces or network interface devices to provide for the transfer of data between the user device 102 and another device (e.g., network server) via one or more networks, such as 118. The communication interfaces may include, but are not limited to: personal area networks (PANs), wired local area networks (LANs), wireless local area networks (WLANs), wireless wide area networks (WWANs), and so forth. The user device 102 may be coupled to the network via a wired connection. However, the wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2007, published Mar. 8, 2007; IEEE 802.11n-2009, published October 2009), or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical, or other signals to exchange data between the user device 102 and another device, such as an access point, a host computer, a server, a router, a reader device, and the like. The networks 118 may include, but are not limited to, the Internet, a private network, a virtual private network, a wireless wide area network, a local area network, a metropolitan area network, a telephone network, and so forth.

The display 116 may include, but is not limited to, a liquid crystal display, a light-emitted diode display, or an E-Ink™ display as made by E Ink Corp. of Cambridge, Mass. The display 116 may be used to show content to a user in the form of text, images, or video. In certain instances, the display 116 may also operate as a touch screen display that may enable the user to initiate commands or operations by touching the screen using certain finger or hand gestures.

With continued reference to FIG. 1, one or more content provider server(s) 120 may also be in communication with the network(s) 118. The content provider server(s) 120 may also include a processor 122 and memory 124, which may store an operating system (O/S) 126, a database management system (DBMS) 128, and a content generation module 130.

The computer processors 122 may comprise one or more cores and may be configured to access and execute (at least in part) computer-readable instructions stored in the memory 124. The one or more computer processors 122 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The content provider server(s) 120 may also include a chipset (not shown) for controlling communications between the one or more processors 122 and one or more of the other components of the content provider server(s) 120. In certain embodiments, the content provider server(s) 120 may be based on an Intel® architecture or an ARM® architecture, and the processor(s) and chipset may be from a family of Intel® processors and chipsets. The one or more processors 122 may also include one or more application-specific integrated circuits (ASICs) or application-specific standard products (ASSPs) for handling specific data processing functions or tasks.

The memory 124 may include one or more computer-readable storage media (CRSM). In some embodiments, the memory 124 may include non-transitory media such as random access memory (RAM), flash RAM, magnetic media, optical media, solid state media, and so forth. The memory 124 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 124 may store an operating system 108 that includes a plurality of computer-executable instructions that may be implemented by the computer processor to perform a variety of tasks to operate the interface(s) and any other hardware installed on the content provider server(s) 120. The memory 124 may also store content that may be displayed by the content provider server(s) 120 or transferred to other devices (e.g., headphones) to be displayed or played by the other devices. The memory 124 may also store content received from the other devices. The content from the other devices may be displayed, played, or used by the u content provider server(s) 120 to perform any necessary tasks or operations that may be implemented by the computer processor or other components in the content provider server(s) 120.

The memory 124 may also include an operating system (O/S) 126, which may provide an interface between other application software executing on the content provider server(s) 120 and hardware resources of the content provider server(s) 120. More specifically, the operating system 126 may include a set of computer-executable instructions for managing hardware resources of the content provider server(s) 120 and for providing common services to other application programs (e.g., managing memory allocation among various application programs). The operating system 108 may include any operating system now known or which may be developed in the future including, but not limited to, any consumer operating system, any server operating system, any mainframe operating system, or any other proprietary or freely available operating system.

The DBMS 128 stored in memory 124 may be configured to support functionality for accessing, retrieving, storing, and/or manipulating data stored in external datastore(s) (e.g., content provider datastore 131), data stored in the memory 124, and/or data stored in the data storage 136. For example, the DBMS 128 may be configured to retrieve and/or otherwise access loyalty account data associated with the consumer 101. The DBMS 128 may use any of a variety of database models (e.g., relational model, object model, etc.) and may support any of a variety of query languages.

The memory 124 may also include a content generation module 130, which may be configured to generate, access, and/or otherwise create media content. For example, in some implementations, the content provider server(s) may be associated with a cable provider that provides television content to a user device 102. To this end, the content generation module 130 may configured to encode media content representing the television content for transmission to the user device 102. In certain embodiments, during encoding of the media content, the content generation module 130 may be configured to encode one or more callback address identifiers into the media content. The callback address identifier may be associated with a location of one or computers and/or servers (e.g., the consumption analysis server(s) 138). For instance, the callback address identifier may be an internet protocol (IP) address and/or a media access control (MAC) address associated with a server and/or computer.

Various techniques may employed for encoding the callback address identifier within the media content. In one implementations, the callback address identifier may be encoded in one or more I-frames of video data associated with the media content. More particularly, during encoding of the video data, the content generation module 130 may be configured to vary the distance between I-frames in the video data. As such, the variable distance(s) between I-frames in the video data may be used to represent (e.g., encode) the callback address identifier. In other implementations, the callback address identifier may be encoded as part of a closed captioning stream, an audio stream, and or any other stream associated with the media content.

The content provider server(s) 120 may also include network and I/O interfaces 132, a display 134, and a storage 136. The one or more network and I/O interfaces 132 may include one or more communication interfaces or network interface devices to provide for the transfer of data between the content provider server(s) 120 and another device (e.g., network server) via one or more networks, such as 118. The communication interfaces may include, but are not limited to: personal area networks (PANs), wired local area networks (LANs), wireless local area networks (WLANs), wireless wide area networks (WWANs), and so forth. The content provider server(s) 120 may be coupled to the network via a wired connection. However, the wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2007, published Mar. 8, 2007; IEEE 802.11n-2009, published October 2009), or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical, or other signals to exchange data between the content provider server(s) 120 and another device, such as an access point, a host computer, a server, a router, a reader device, and the like. The networks 118 may include, but are not limited to, the Internet, a private network, a virtual private network, a wireless wide area network, a local area network, a metropolitan area network, a telephone network, and so forth.

The display 134 may include, but is not limited to, a liquid crystal display, a light-emitted diode display, or an E-Ink™ display as made by E Ink Corp. of Cambridge, Mass. The display 134 may be used to show content to a user in the form of text, images, or video. In certain instances, the display 134 may also operate as a touch screen display that may enable the user to initiate commands or operations by touching the screen using certain finger or hand gestures.

Storage 136 may provide non-transient storage of computer-executable instructions and other data and may include removable storage and/or non-removable storage including, but not limited to, magnetic storage, optical disk storage, and/or tape storage. The storage 136 may include storage that is internal and/or external to the content provider server(s) 120.

With continued reference to FIG. 1, one or more consumption analysis server(s) 138 may also be in communication with the network(s) 118. The consumption analysis server(s) 138 may also include processor(s) 140 and memory 142, which may store an operating system (O/S) 144, a database management system (DBMS) 146, and a consumption analysis module 148.

The computer processors 140 may comprise one or more cores and may be configured to access and execute (at least in part) computer-readable instructions stored in the memory 142. The one or more computer processors 140 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The consumption analysis server(s) 138 may also include a chipset (not shown) for controlling communications between the one or more processors 140 and one or more of the other components of the consumption analysis server(s) 138. In certain embodiments, the consumption analysis server(s) 138 may be based on an Intel® architecture or an ARM® architecture, and the processor(s) and chipset may be from a family of Intel® processors and chipsets. The one or more processors 140 may also include one or more application-specific integrated circuits (ASICs) or application-specific standard products (ASSPs) for handling specific data processing functions or tasks.

The memory 142 may include one or more computer-readable storage media (CRSM). In some embodiments, the memory 142 may include non-transitory media such as random access memory (RAM), flash RAM, magnetic media, optical media, solid state media, and so forth. The memory 142 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 142 may store an operating system 144 that includes a plurality of computer-executable instructions that may be implemented by the computer processor to perform a variety of tasks to operate the interface(s) and any other hardware installed on the consumption analysis server(s) 138. The memory 142 may also store content that may be displayed by the consumption analysis server(s) 138 or transferred to other devices (e.g., headphones) to be displayed or played by the other devices. The memory 142 may also store content received from the other devices. The content from the other devices may be displayed, played, or used by the u consumption analysis server(s) 138 to perform any necessary tasks or operations that may be implemented by the computer processor or other components in the consumption analysis server(s) 138.

As previously discussed, the memory 142 may also include an operating system (O/S) 144, which may provide an interface between other application software executing on the consumption analysis server(s) 138 and hardware resources of the consumption analysis server(s) 138. More specifically, the operating system 144 may include a set of computer-executable instructions for managing hardware resources of the consumption analysis server(s) 138 and for providing common services to other application programs (e.g., managing memory allocation among various application programs). The operating system 108 may include any operating system now known or which may be developed in the future including, but not limited to, any consumer operating system, any server operating system, any mainframe operating system, or any other proprietary or freely available operating system.

The DBMS 146 stored in memory 142 may be configured to support functionality for accessing, retrieving, storing, and/or manipulating data stored in external datastore(s), data stored in the memory 142, and/or data stored in the data storage 154. For example, the DBMS 146 may be configured to retrieve and/or otherwise access loyalty account data associated with the consumer 101. The DBMS 146 may use any of a variety of database models (e.g., relational model, object model, etc.) and may support any of a variety of query languages.

The memory 142 may also include a consumption analysis module 148, which may be configured to store, retrieve, access, and/or otherwise receive playback statistics associated with media content. For example, as previously discussed, during and/or after playback of media content (e.g., media content that has been generated by the content provider server9s) 120) on a user device 102, one or more playback statistics may be determined. The playback statistics may include data related to how the media content was consumed by the user 101 (e.g., how the media content was engaged in playback). Furthermore, as previously discussed, the media content may include a callback address identifier. To this end, the callback address identifier may be associated with a location of the consumption analysis server(s) 138. As such, the user device 102 may be configured (e.g., via the playback statistics module 112) to transmit the playback statistics to the consumption analysis module 148 of the consumption analysis server(s) 138 using the callback address identifier.

Additionally, the consumption analysis module 148 may be configured to aggregate playback statistics, associated with a particular median content, across multiple user devices 102 and/or other devices capable of performing playback of the media content. For example, the media content may include a television show, which may be streamed, played, and/or otherwise distributed to multiple user devices 102. The television show may include a callback address identifier, which may point to the location of the consumption analysis server(s) 138. As such, the consumption analysis server(s) 138 may receive playback statistics associated with the television show across all of the multiple user device(s) 102, which may facilitate the determination of performance trends associated with the television show (e.g., frequency of pausing and/or stopping playback, number of users engaged in uninterrupted playback, and/or the like).

The consumption analysis server(s) 138 may also include network and I/O interfaces 150, a display 152, and a storage 154. Storage 154 may provide non-transient storage of computer-executable instructions and other data and may include removable storage and/or non-removable storage including, but not limited to, magnetic storage, optical disk storage, and/or tape storage. The storage 154 may include storage that is internal and/or external to the payment processing server(s) 138.

The include network and I/O interfaces 150, a display 152, and a storage 154. The one or more network and I/O interfaces 150 may include one or more communication interfaces or network interface devices to provide for the transfer of data between the consumption analysis server(s) 138 and another device (e.g., network server) via one or more networks, such as 118. The communication interfaces may include, but are not limited to: personal area networks (PANs), wired local area networks (LANs), wireless local area networks (WLANs), wireless wide area networks (WWANs), and so forth. The consumption analysis server(s) 138 may be coupled to the network via a wired connection. However, the wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2007, published Mar. 8, 2007; IEEE 802.11n-2009, published October 2009), or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical, or other signals to exchange data between the consumption analysis server(s) 138 and another device, such as an access point, a host computer, a server, a router, a reader device, and the like. The networks 118 may include, but are not limited to, the Internet, a private network, a virtual private network, a wireless wide area network, a local area network, a metropolitan area network, a telephone network, and so forth.

The display 152 may include, but is not limited to, a liquid crystal display, a light-emitted diode display, or an E-Ink™ display as made by E Ink Corp. of Cambridge, Mass. The display 152 may be used to show content to a user in the form of text, images, or video. In certain instances, the display 152 may also operate as a touch screen display that may enable the user to initiate commands or operations by touching the screen using certain finger or hand gestures.

Storage 154 may provide non-transient storage of computer-executable instructions and other data and may include removable storage and/or non-removable storage including, but not limited to, magnetic storage, optical disk storage, and/or tape storage. The storage 154 may include storage that is internal and/or external to the consumption analysis server(s) 138.

Figure 2:
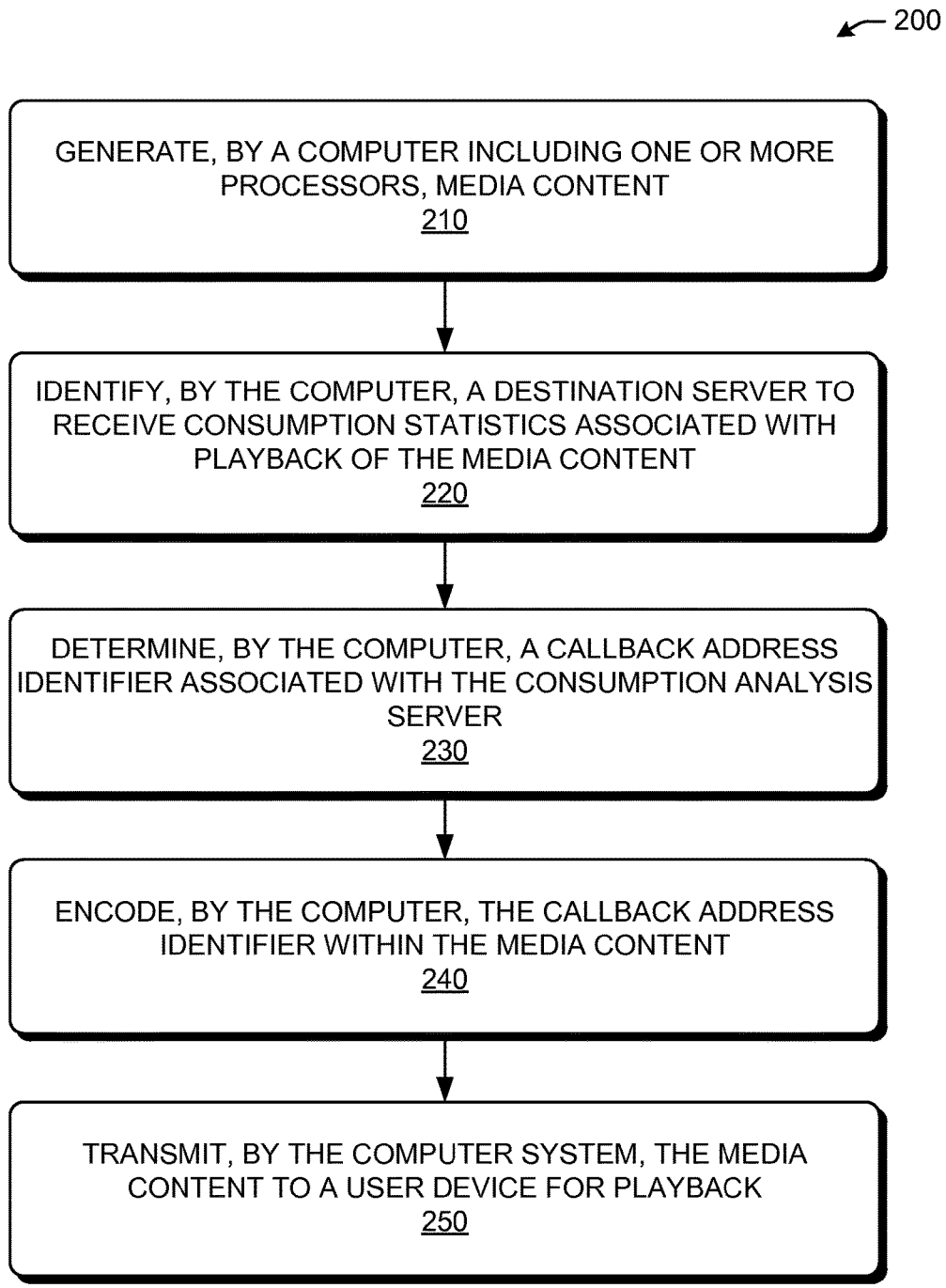
FIG. 2 depicts a flow diagram of a method for providing callback addresses, in accordance with one or more embodiments of the disclosure.

FIG. 2 illustrates a flow diagram of a method 200 for providing callback addresses, according to one or more embodiments disclosed herein. The method 200 may begin in block 210, in which a server, such as a content provider server 120 in FIG. 1, may generate media content. In block 220, the content provider server 120 may identify a destination server, such as a consumption analysis server 138 in FIG. 1, to receive playback statistics associated with playback of the media content In block 230, the content provider server 120 may determine a callback address identifier associated with the destination server (e.g., the consumption analysis server 138). In block 240, the content provider server 120 may encode the callback address identifier within the media content. In block 250, the content provider server 120 may transmit the media content, which includes the encoded callback address identifier, to a user device (e.g., the user device 102 in FIG. 1) for playback.

Figure 3:
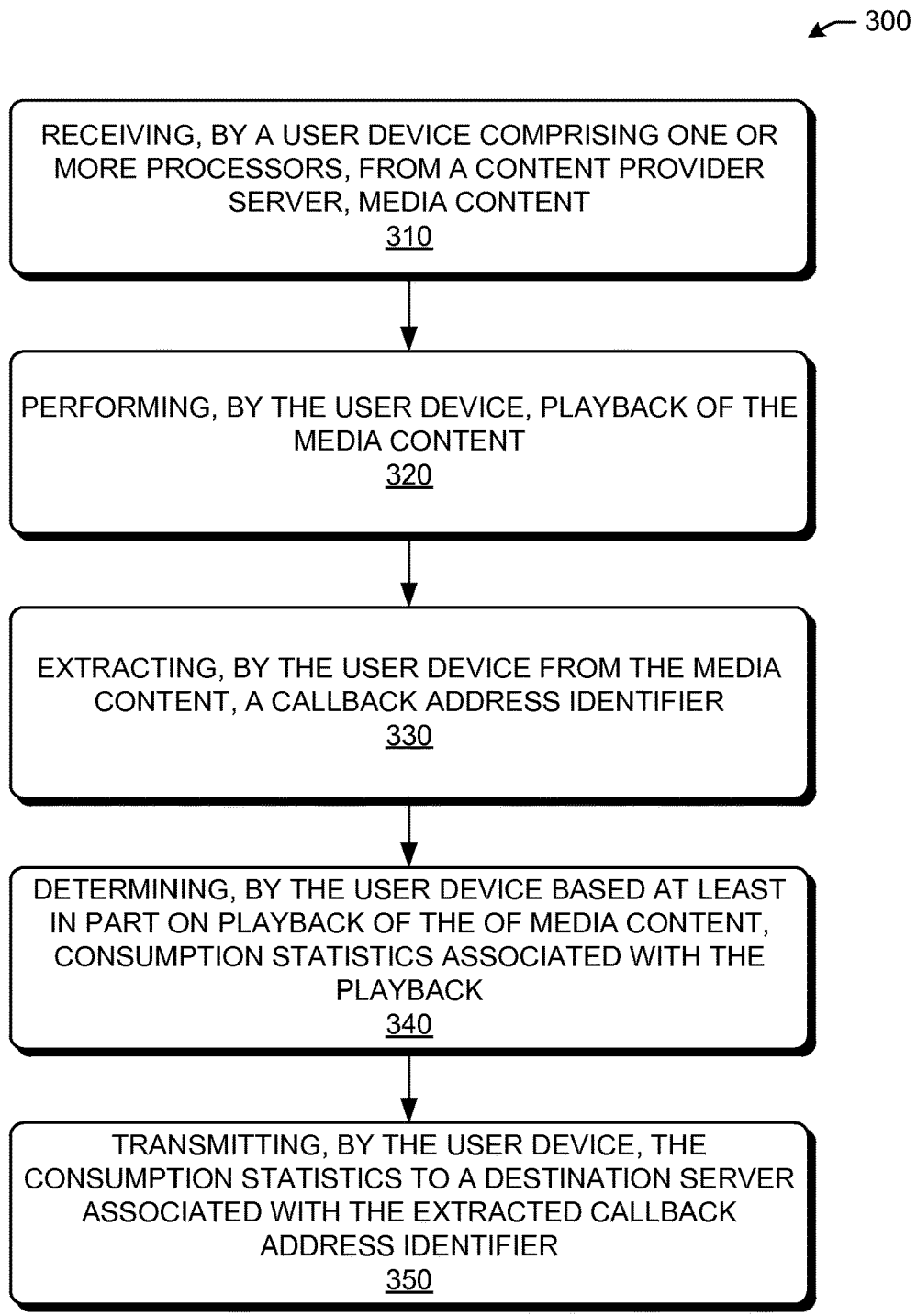
FIG. 3 depicts a flow diagram of a method for providing callback addresses, in accordance with one or more embodiments of the disclosure

FIG. 3 illustrates a flow diagram of a method 300 for providing callback addresses, according to one or more embodiments disclosed herein. The method 300 may begin in block 310, in which a user device, such as the user device 102 in FIG. 1, may receive, from a content provider server (e.g., content provider server 120 in FIG. 1.), media content for playback. In block 320, the user device 102 may perform playback of the media content.

Furthermore, in block 330, the user device 102 may extract, from the media content, a callback address identifier encoded in the media content. In block 340, the user device 102 may be configured to determine, based at least in part on playback of the media content, one or more playback statistics associated with the playback. To this end, in block 350, the user device 102 may be configured to transmit the playback statistics to a destination server, such as the consumption analysis server 138 in FIG. 1, which may be associated with the extracted callback address identifier.

Certain aspects of the disclosure are described above with reference to block and flow diagrams of systems, methods, apparatus, and/or computer program products according to example embodiments. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, certain embodiments may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method, comprising:
    identifying, by a computer comprising one or more processors, a destination server that analyzes playback statistics received from one or more user devices, wherein the playback statistics are indicative of consumption of playable media content and comprise a media player type identifier and a media player version identifier of the one or more user devices, wherein the playable media content comprises video data including a plurality of I-frames;
    determining, by the computer, a callback address identifier of the destination server, wherein the callback address identifier represents a location to send an indication that at least a portion of the playable media content has been consumed by the one or more user devices;
    determining, based at least in part on the callback address identifier, a distance between respective I-frames of the plurality of I-frames;
    encoding, by the computer, a first I-frame and a second I-frame of the plurality of I-frames, wherein the distance is included between the first I-frame and the second I-frame; and
    transmitting, by the computer, the playable media content to the one or more user devices for playback, wherein the distance indicates the callback address identifier.

2. The computer-implemented method of claim 1, wherein the playable media content further comprises at least one of video content or audio content.

3. The computer-implemented method of claim 1, wherein the playable media content further comprises a video advertisement.

4. The computer-implemented method of claim 1, wherein the callback address identifier comprises at least one of an Internet Protocol address or a Media Access Channel address associated with the destination server.

5. The computer-implemented method of claim 1, wherein the playback statistics are transmitted from the user device to the destination server during or after playback of the playable media content on the user device.

6. A system, comprising:
    at least one memory that stores computer-executable instructions; and
    at least one processor configured to access the at least one memory, wherein the at least one processor is configured to execute the computer-executable instructions to:
        identify a destination server to analyze playback statistics received from one or more user devices, wherein the playback statistics are indicative of consumption of playable media content and comprise a media player type identifier and a media player version identifier of the one or more user devices, wherein the playable media content comprises video data including a plurality of I-frames;
        determine a callback address identifier of the destination server, wherein the callback address identifier represents a location to send an indication that at least a portion of the playable media content has been consumed by the one or more user devices;
        determine, based at least in part on the callback address identifier, a distance between respective I-frames of the plurality of I-frames;
        encode a first I-frame and a second I-frame of the plurality of I-frames, wherein the distance is included between the first I-frame and the second I-frame; and
        transmit the playable media content to the one or more user devices for playback, wherein the distance indicates the callback address identifier.

7. The system of claim 6, wherein the playable media content further comprises at least one of video content or audio content.

8. The system of claim 6, wherein the playable media content further comprises a video advertisement.

9. The system of claim 6, wherein the callback address identifier comprises at least one of an Internet Protocol address or a Media Access Channel address associated with the destination server.

10. The system of claim 6, wherein the playback statistics are transmitted from the user device to the destination server during or after playback of the playable media content on the user device.

11. A computer-implemented method, comprising:
receiving, by a user device comprising one or more processors, from a content provider server, playable media content, the playable media content comprising encoded video data including a plurality of I-frames;
performing, by the user device, playback of the playable media content;
determining, by the user device based at least in part on the playback of the playable media content, playback statistics associated with the playback, wherein the playback statistics comprise a media player type identifier and a media player version identifier;
determining a distance between a first I-frame and a second I-frame of the plurality of I-frames;
determining, based at least in part on the distance, a callback address identifier associated with a destination server, the callback address identifier representing a location to send an indication that at least a portion of the playable media content has been consumed by the user device; and
transmitting, by the user device and based at least in part on determining the callback address identifier, the playback statistics to the destination server.

12. The computer-implemented method of claim 11, wherein the playable media content further comprises at least one of video content or audio content.

13. The computer-implemented method of claim 11, wherein the playable media content further comprises a video advertisement.

14. The computer-implemented method of claim 11, wherein the callback address identifier comprises at least one of an Internet Protocol address or a Media Access Channel address associated with the destination server.

* * * * *